(12) United States Patent
Shiotsu

(10) Patent No.: US 11,454,421 B2
(45) Date of Patent: Sep. 27, 2022

(54) HEAT EXCHANGER AND WATER HEATING APPARATUS

(71) Applicant: NORITZ CORPORATION, Hyogo (JP)

(72) Inventor: Naoya Shiotsu, Akashi (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 17/093,661

(22) Filed: Nov. 10, 2020

(65) Prior Publication Data

US 2021/0190374 A1   Jun. 24, 2021

(30) Foreign Application Priority Data

Dec. 24, 2019 (JP) ............................. JP2019-232566

(51) Int. Cl.
  *F24H 3/08*  (2022.01)
(52) U.S. Cl.
  CPC .................................. *F24H 3/087* (2013.01)

(58) Field of Classification Search
None
See application file for complete search history.

(56) References Cited

U.S. PATENT DOCUMENTS

| | | | |
|---|---|---|---|
| 2013/0264037 A1* | 10/2013 | Otsubo | F28F 9/00 165/157 |
| 2019/0195563 A1 | 6/2019 | Ohigashi et al. | |
| 2020/0064020 A1* | 2/2020 | Aoki | F24H 1/145 |

FOREIGN PATENT DOCUMENTS

JP   2019113280   7/2019

* cited by examiner

*Primary Examiner* — Jason Lau
(74) *Attorney, Agent, or Firm* — JCIPRNET

(57) ABSTRACT

A heat exchanger including a gas inlet through which a combustion gas flows in and a gas outlet through which the combustion gas flows out is provided. The heat exchanger includes a housing in which the gas outlet is formed, a partition member, and a plurality of heat transfer tubes accommodated in the housing. The partition member is mounted in the housing so that there is a portion in which a flow area of the combustion gas is smaller than that of the gas inlet between the gas inlet and the gas outlet.

2 Claims, 6 Drawing Sheets

HEAT EXCHANGER AND WATER HEATING APPARATUS

CROSS-REFERENCE TO RELATED APPLICATIONS

This application claims the priority benefit of Japanese Patent Application No. 2019-232566, filed on Dec. 24, 2019. The entirety of the above-mentioned patent application is hereby incorporated by reference herein and made a part of this specification.

BACKGROUND

Technical Field

The present disclosure relates to a heat exchanger and a water heating apparatus.

Description of Related Art

Japanese Patent Laid-Open No. 2019-113280 describes a heat exchanger. The heat exchanger described in Japanese Patent Laid-Open No. 2019-113280 includes a housing and a heat transfer tube. The housing includes a first side wall, a second side wall, a third side wall, and a fourth side wall. The housing includes an upper opening defined by upper ends of the first side wall, the second side wall, the third side wall and the fourth side wall, and a lower opening defined by lower ends of the first side wall, the second side wall, the third side wall and the fourth side wall. In the heat exchanger described in Japanese Patent Laid-Open No. 2019-113280, the upper opening serves as a gas inlet which allows combustion gas to flow in, and the lower opening serves as a gas outlet which allows the combustion gas to flow out. The heat transfer tube is accommodated inside the housing. A temperature of water flowing through the heat transfer tube is raised by exchanging heat with the combustion gas.

A temperature of the combustion gas flowing inside the housing decreases as the combustion gas approaches the gas outlet. As a result, a volume and a flow velocity of the combustion gas flowing inside the housing decrease as the combustion gas approaches the gas outlet. The decrease in the flow velocity of the combustion gas flowing inside the housing leads to a decrease in efficiency of heat exchange with the water flowing through the heat transfer tube. As described above, the heat exchanger described in Japanese Patent Laid-Open No. 2019-113280 has room for improvement in the efficiency of heat exchange.

SUMMARY

The present disclosure has been made in view of the above-described problems of the related art. More specifically, the present disclosure provides a heat exchanger and a water heating apparatus with improved efficiency in heat exchange.

A heat exchanger according to a first aspect of the present disclosure is a heat exchanger including a gas inlet through which a combustion gas flows in, and a gas outlet through which the combustion gas flows out. The heat exchanger includes a housing in which the gas outlet is formed, a partition member, and a plurality of heat transfer tubes accommodated in the housing. The partition member is mounted in the housing so that there is a portion in which a flow area of the combustion gas is smaller than that of the gas inlet between the gas inlet and the gas outlet. The plurality of heat transfer tubes may meander in a plane intersecting a first direction and may be disposed to overlap each other in the first direction. The housing may include a first side wall, a second side wall, a third side wall, a fourth side wall, and a bottom wall. The first side wall and the second side wall may face each other in the first direction. The third side wall and the fourth side wall may face each other in a second direction intersecting the first direction. The gas outlet may be formed in the first side wall. The housing may have an opening defined by the first side wall, the second side wall, the third side wall and the fourth side wall. The partition member may include a first portion configured to define the gas inlet by closing a part of the opening, and a second portion configured to extend from the first portion toward the bottom wall in a plane intersecting the first direction.

The heat exchanger may further include a first header, a second header and a third header mounted on the third side wall. A water inlet may be formed in the first header. A water outlet may be formed in the second header. Each of the plurality of heat transfer tubes may include a first end portion, and a second end portion closer to the opening than to the first end portion in a third direction intersecting the first direction and the second direction. The second end portion of each of the plurality of heat transfer tubes between the second portion and the first side wall may be connected to the first header. The second end portion of each of the plurality of heat transfer tubes between the second portion and the second side wall may be connected to the second header. The first end portion of each of the plurality of heat transfer tubes may be connected to the third header.

A heat exchanger according to a second aspect of the present disclosure is a heat exchanger including a gas inlet through which a combustion gas flows in, and a gas outlet through which the combustion gas flows out. The heat exchanger includes a housing in which the gas outlet is formed, a partition member, and a plurality of heat transfer tubes accommodated in the housing. The heat exchanger may further include a plurality of heat transfer tubes accommodated in the housing. The plurality of heat transfer tubes may meander in a plane intersecting a first direction and may be disposed to overlap each other in the first direction. The housing may include a first side wall, a second side wall, a third side wall, and a fourth side wall. The first side wall and the second side wall may face each other in the first direction. The third side wall and the fourth side wall may face each other in a second direction intersecting the first direction. The gas outlet may be formed in the first side wall. The housing may have an opening defined by the first side wall, the second side wall, the third side wall and the fourth side wall and configured to serve as the gas inlet. The partition member may be closer to the gas inlet than to the gas outlet in a third direction intersecting the first direction and the second direction. The partition member may extend from one of the first side wall and the second side wall toward the other one of the first side wall and the second side wall in a plane intersecting the third direction.

A water heating apparatus according to an aspect of the present disclosure includes the above heat exchanger, a burner, and a duct. The burner produces combustion gas. The duct is connected to the gas outlet.

The above and other objectives, features, aspects and advantages of the disclosure will become apparent from the following detailed description of the disclosure as understood in connection with the accompanying drawings.

DESCRIPTION OF THE EMBODIMENTS

Figure 1:
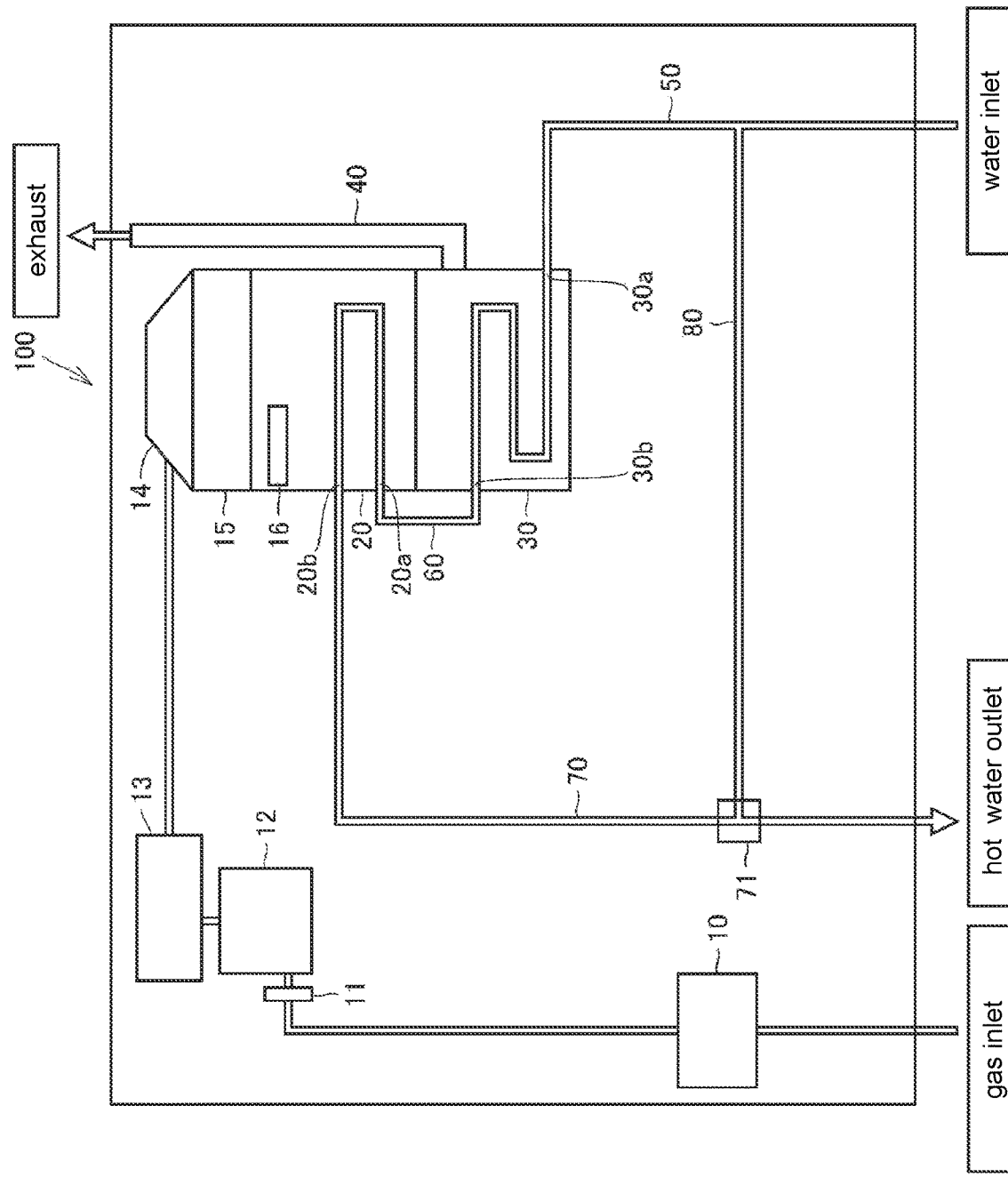
FIG. 1 is a schematic view of a water heating apparatus.

Details of embodiments will be described with reference to the drawings. In the following drawings, the same or corresponding parts will be designated by the same reference numerals, and the duplicated description will not be repeated.

First Embodiment

A water heating apparatus (hereinafter, referred to as "water heating apparatus 100") according to a first embodiment will be described below.

<Schematic Configuration of Water Heating Apparatus 100>

FIG. 1 is a schematic view of the water heating apparatus 100. As shown in FIG. 1, the water heating apparatus 100 includes a gas valve 10, an orifice 11, a venturi 12, a blower 13, a chamber 14, a burner 15, a spark plug 16, a primary heat exchanger 20, a secondary heat exchanger 30, a duct 40, a pipe. 50, a pipe 60, a pipe 70, and a bypass pipe 80. A detailed configuration of the secondary heat exchanger 30 will be described later.

Fuel gas is supplied to the venturi 12 through the orifice 11 by opening the gas valve 10. The fuel gas supplied to the venturi 12 is mixed with air in the venturi 12 (hereinafter, the fuel gas mixed with air is referred to as a mixed gas). The mixed gas is supplied to the burner 15 through the chamber 14 by the blower 13. The mixed gas supplied to the burner 15 is ignited and burned by sparking the spark plug 16. Thus, combustion gas is generated in the burner 15.

One end of the pipe 50 is connected to a water supply. The other end of the pipe 50 is connected to a water inlet 30a of the secondary heat exchanger 30. One end of the pipe 60 is connected to a water outlet 30b of the secondary heat exchanger 30. The other end of the pipe 60 is connected to a water inlet 20a of the primary heat exchanger 20. One end of the pipe 70 is connected to a water outlet 20b of the primary heat exchanger 20. The other end of the pipe 70 is connected to a hot water tap (not shown).

One end of the bypass pipe 80 is connected to the pipe 50, and the other end thereof is connected to the pipe 70. The bypass pipe 80 and the pipe 70 are connected by a three-way valve 71. The duct 40 is connected to the secondary heat exchanger 30.

Water supplied from one end of the pipe 50 flows through the pipe 50 and is supplied to the secondary heat exchanger 30. A temperature of the water supplied to the secondary heat exchanger 30 is raised by exchanging heat with the combustion gas. The water flowing through the secondary heat exchanger 30 flows through the pipe 60 and is supplied to the primary heat exchanger 20. A temperature of the water supplied to the primary heat exchanger 20 is raised by exchanging heat with the combustion gas. The water flowing through the primary heat exchanger 20 is supplied from the hot water tap through the pipe 70. The combustion gas that has exchanged heat with the water flowing through the primary heat exchanger 20 and the secondary heat exchanger 30 is discharged to the outside from the duct 40.

<Detailed Configuration of Secondary Heat Exchanger 30 in Water Heating Apparatus 100>

Figure 2:
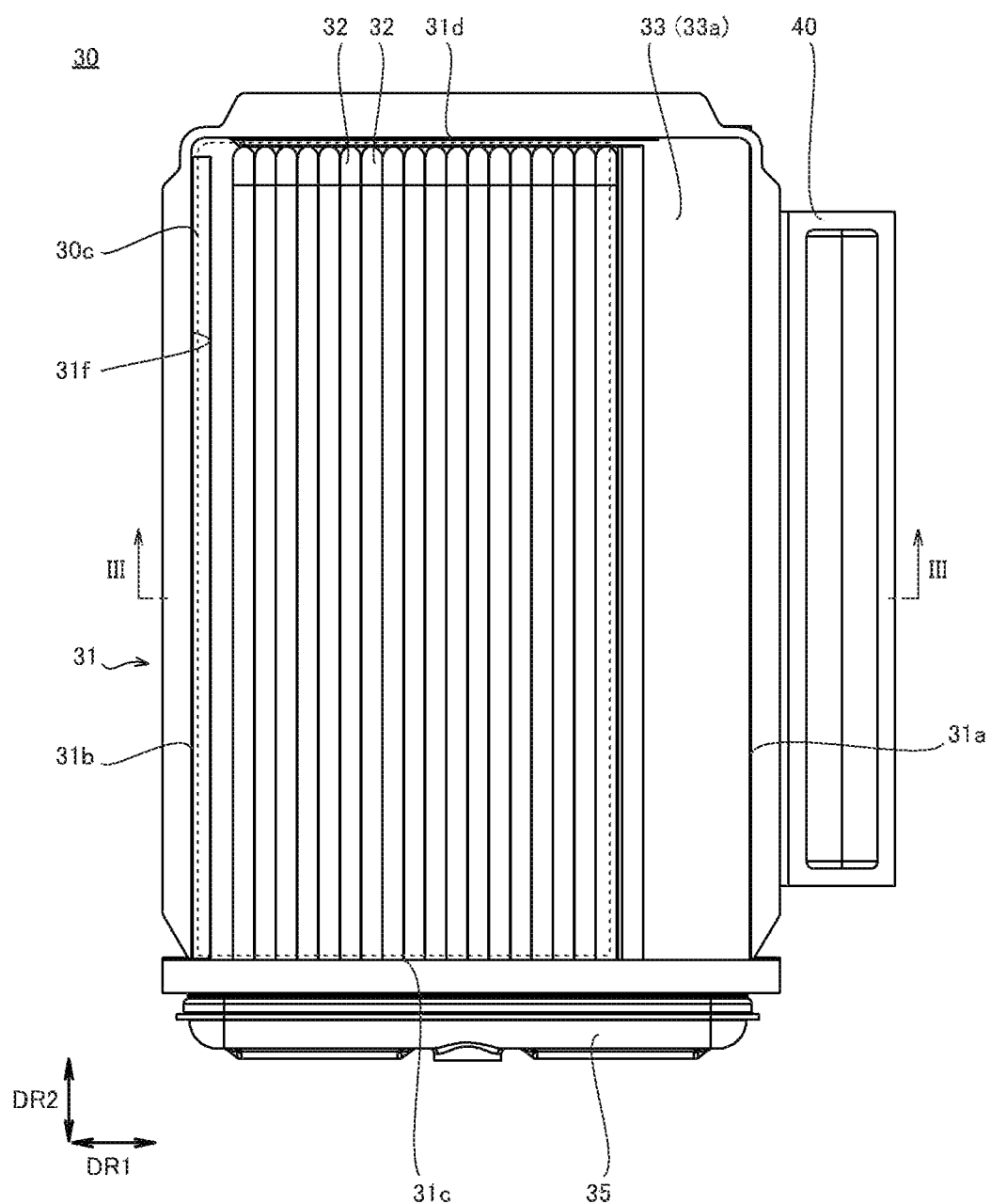
FIG. 2 is a plan view of a secondary heat exchanger in the water heating apparatus.
Figure 3:
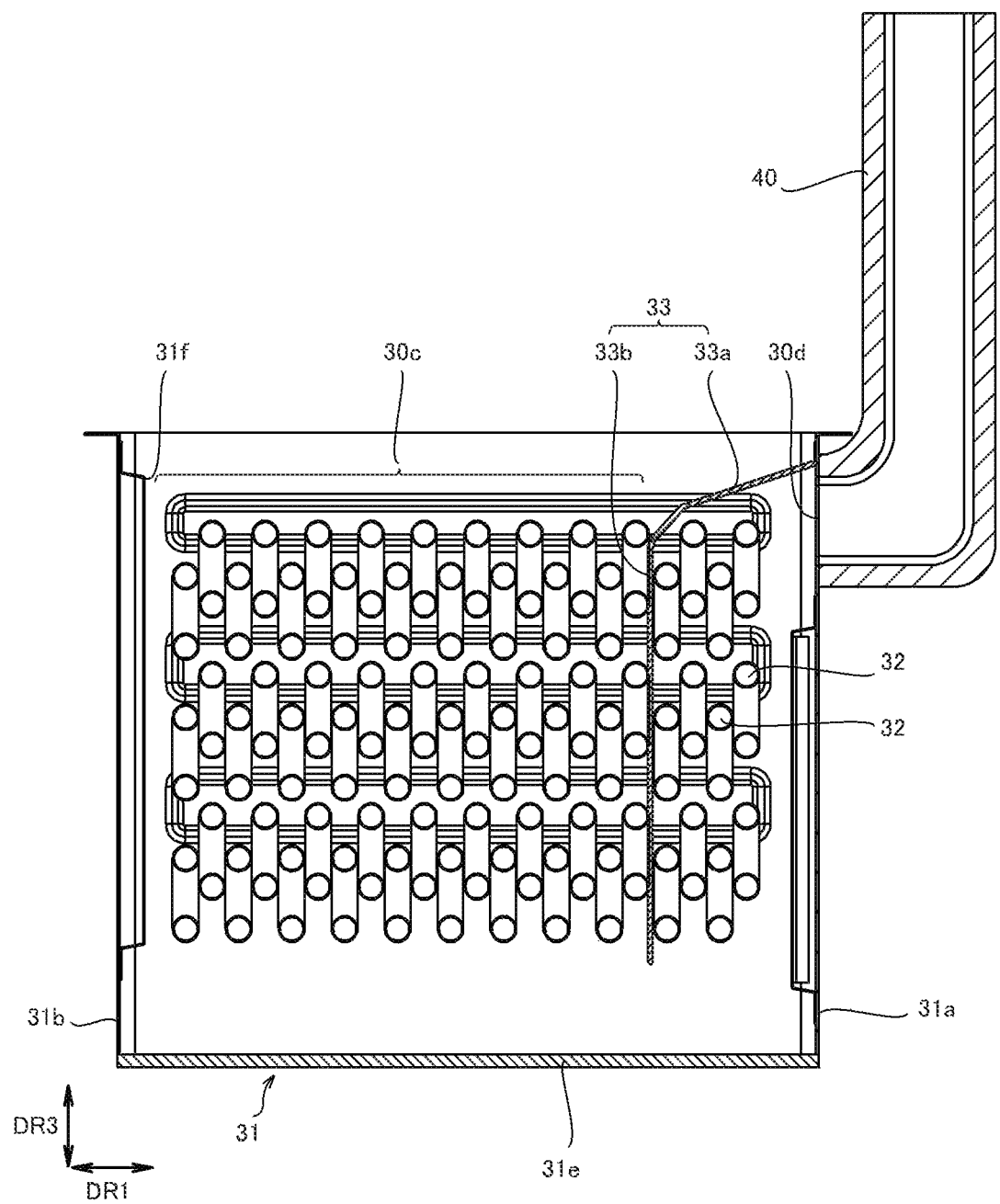
FIG. 3 is a cross-sectional view taken along line III-III of FIG. 2.
Figure 4:
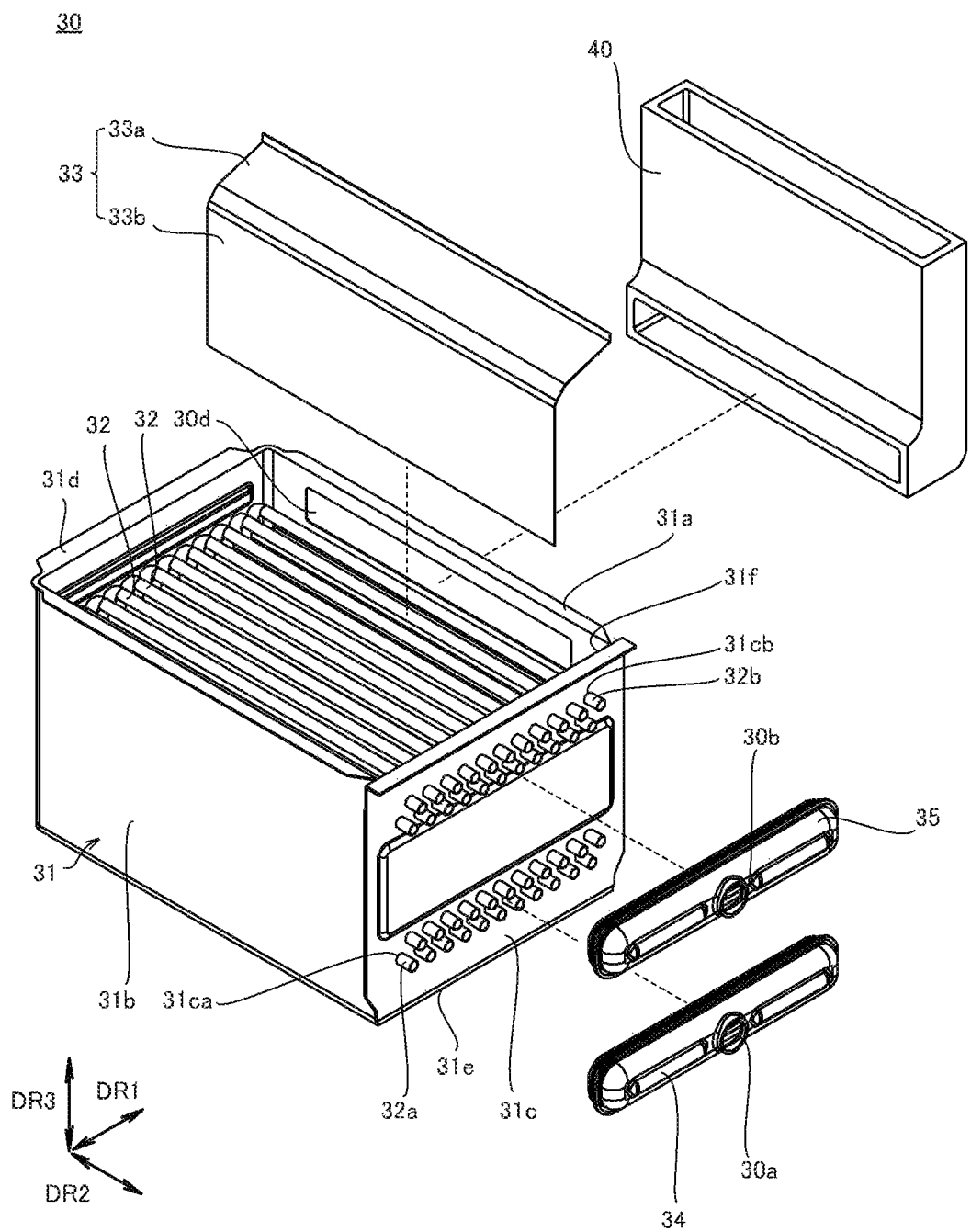
FIG. 4 is an exploded perspective view of the secondary heat exchanger in the water heating apparatus.

FIG. 2 is a plan view of the secondary heat exchanger 30 in the water heating apparatus 100. FIG. 3 is a cross-sectional view taken along line III-III of FIG. 2. FIG. 4 is an exploded perspective view of the secondary heat exchanger 30 in the water heating apparatus 100. FIGS. 2 to 4 also show the duct 40. As shown in FIGS. 2 to 4, the secondary heat exchanger 30 includes a housing 31, a plurality of heat transfer tubes 32, a partition member 33, a header 34, and a header 35.

The housing 31 has a side wall 31a, a side wall 31b, a side wall 31c, a side wall 31d, and a bottom wall 31e. The side wall 31a and the side wall 31b face each other in a first direction DR1. The side wall 31c and the side wall 31d face each other in a second direction DR2. The second direction DR2 is a direction that intersects the first direction DR1. The second direction DR2 may be orthogonal to the first direction DR1.

A gas outlet 30d is formed on the side wall 31a. The combustion gas flows out from the gas outlet 30d. The gas outlet 30d passes through the side wall 31a in a thickness direction. The gas outlet 30d is formed, for example, on the upper end side of the side wall 31a. The duct 40 is connected to the gas outlet 30d.

A plurality of through holes 31ca and a plurality of through holes 31cb are formed in the side wall 31c. The through holes 31ca and the through holes 31cb pass through the side wall 31c in the thickness direction. The through holes 31ca are arranged in two rows in the first direction DR1, and the through holes 31cb are arranged in two rows along the first direction DR1. The through holes 31ca are located on the lower end side of the side wall 31c from the through holes 31cb. The number of through holes 31ca and the number of through holes 31cb are equal to the number of heat transfer tubes 32.

The housing 31 has an opening 31f. The opening 31f is defined by upper ends of the side walls 31a to 31d. The bottom wall 31e is connected to lower ends of the side wall 31a to the side wall 31d. A direction from the opening 31f toward the bottom wall 31e follows a third direction DR3. The third direction DR3 is a direction that intersects the first direction DR1 and the second direction DR2. The third direction DR3 may be orthogonal to the first direction DR1 and the second direction DR2.

The plurality of heat transfer tubes 32 is arranged to overlap each other in the first direction DR1. The heat transfer tubes 32 meander in a plane intersecting the first direction DR1. Each of the heat transfer tubes 32 has a first end portion 32a and a second end portion 32b. The first end portion 32a is inserted through the through hole 31ca, and the second end portion 32b is inserted through the through hole 31cb. From another point of view, the second end portion 32b is closer to the opening 31f than to the first end portion 32a in the third direction DR3. As described above, since the through holes 31ca (the through holes 31cb) are formed to be in two rows in the first direction DR1, the heat transfer tubes 32 overlap each other in the first direction DR1 while being alternately displaced in the third direction DR3.

The partition member 33 is mounted in the housing 31. The partition member 33 includes a first portion 33a and a second portion 33b. One end of the first portion 33a in the first direction DR1 is mounted near an upper end of the side wall 31a. The first portion 33a extends in the first direction DR1. A width of the first portion 33a in the second direction DR2 coincides with a width of the opening 31f in the second direction DR2. Accordingly, the first portion 33a closes a part of the opening 31f. A portion of the opening 31f that is not closed by the first portion 33a constitutes the gas inlet 30c. The combustion gas flows in from the gas inlet 30c.

The second portion 33b extends from one end thereof in the first direction DR1. The second portion 33b extends toward the bottom wall 31e in the plane intersecting the first direction DR1. That is, one side of a main surface of the second portion 33b faces the side wall 31a, and the other side of the main surface thereof faces the side wall 31b. The second portion 33b passes between two adjacent heat transfer tubes 32 in the first direction DR1.

There is a gap between a lower end of the second portion 33b (an end opposite to the first portion 33a) and the bottom wall 31e. The combustion gas can pass through the gap. A flow area of the combustion gas in the gap between the second portion 33b and the bottom wall 31e is smaller than a flow area of the combustion gas at the gas inlet 30c.

An internal space of the housing 31 from the gas inlet 30c to the gap between the lower end of the second portion 33b and the bottom wall 31e serves as a first flow path. An internal space of the housing 31 from the gap between the lower end of the second portion 33b and the bottom wall 31e to the gas outlet 30d serves as a second flow path. A flow area of the combustion gas in the second flow path is smaller than a flow area of the combustion gas in the first flow path.

A distance between the second portion 33b and the side wall 31a in the first direction DR1 is shorter than a distance between the second portion 33b and the side wall 31b in the first direction DR1. As a result, the number of heat transfer tubes 32 between the second portion 33b and the side wall 31a is smaller than the number of heat transfer tubes 32 between the second portion 33b and the side wall 31b. From another point of view, a total heat transfer area of the heat transfer tubes 32 in the second flow path is smaller than a total heat transfer area of the heat transfer tubes 32 in the first flow path.

The header 34 and the header 35 are mounted on an outer wall surface of the side wall 31c. The inside of each of the header 34 and the header 35 is hollow. The header 34 is connected to the first end portion 32a. The water inlet 30a is formed in the header 34. The water inlet 30a communicates with the inside of the header 34. The water supplied from the water inlet 30a via the pipe 50 is supplied to the heat transfer tube 32 via the header 34.

The header 35 is connected to the second end portion 32b. The water outlet 30b is formed in the header 35. The water outlet 30b communicates with the inside of the header 35. The water flowing through the heat transfer tube 32 is supplied to the pipe 60 from the water outlet 30b via the header 35. The water supplied to the secondary heat exchanger 30 exchanges heat with the combustion gas while flowing through the heat transfer tube 32.

<Effects of Secondary Heat Exchanger 30 in Water Heating Apparatus 100>

A temperature of the combustion gas flowing inside the housing 31 decreases as it approaches the gas outlet 30d. Since the volume of the combustion gas also decreases as the temperature of the combustion gas decreases, the flow velocity of the combustion gas decreases as it approaches the gas outlet 30d. As a result, the efficiency of heat exchange between the combustion gas and the water flowing through the heat transfer tube 32 decreases on the gas outlet 30d side.

However, in the secondary heat exchanger 30, the partition member 33 is mounted in the housing 31 so that a portion in which the flow area of the combustion gas is smaller than that of the gas inlet 30c is present between the gas inlet 30c and the gas outlet 30d. More specifically, in the secondary heat exchanger 30, the flow area of the combustion gas in the gap between the lower end of the second portion 33b and the bottom wall 31e is smaller than the flow area of the combustion gas at the gas inlet 30c.

As a result, in the secondary heat exchanger 30, the flow velocity of the combustion gas increases when passing through the gap between the lower end of the second portion 33b and the bottom wall 31e. As described above, according to the secondary heat exchanger 30, as a result of decrease in the flow velocity of the combustion gas on the gas outlet 30d side being curbed, the efficiency of heat exchange between the combustion gas and the water flowing through the heat transfer tube 32 is improved.

When the partition member 33 is disposed so that the flow area of the combustion gas in the second flow path becomes smaller than the flow area of the combustion gas in the first flow path, the decrease in the flow velocity of the combustion gas in the gas outlet 30d side is further curbed, and thus the efficiency of heat exchange between the combustion gas and the water flowing through the heat transfer tube 32 is further improved.

Second Embodiment

Hereinafter, a water heating apparatus (hereinafter, referred to as "water heating apparatus 200") according to a second embodiment will be described. Here, points different from the water heating apparatus 100 will be mainly described, without repeated duplicated description.

<Schematic Configuration of Water Heating Apparatus 200>

The water heating apparatus 200 includes a gas valve 10, an orifice 11, a venturi 12, a blower 13, a chamber 14, a burner 15, a spark plug 16, a primary heat exchanger 20, a secondary heat exchanger 30, a duct 40, a pipe 50, a pipe 60, a pipe 70, and a bypass pipe 80. In this respect, the configuration of the water heating apparatus 200 is shared by the configuration of the water heating apparatus 100. However, the configuration of the water heat apparatus 200 is different from the configuration of the water heating apparatus 100 in the detailed configuration of the secondary heat exchanger 30.

<Detailed Configuration of Secondary Heat Exchanger 30 in Water Heating Apparatus 200>

Figure 5:
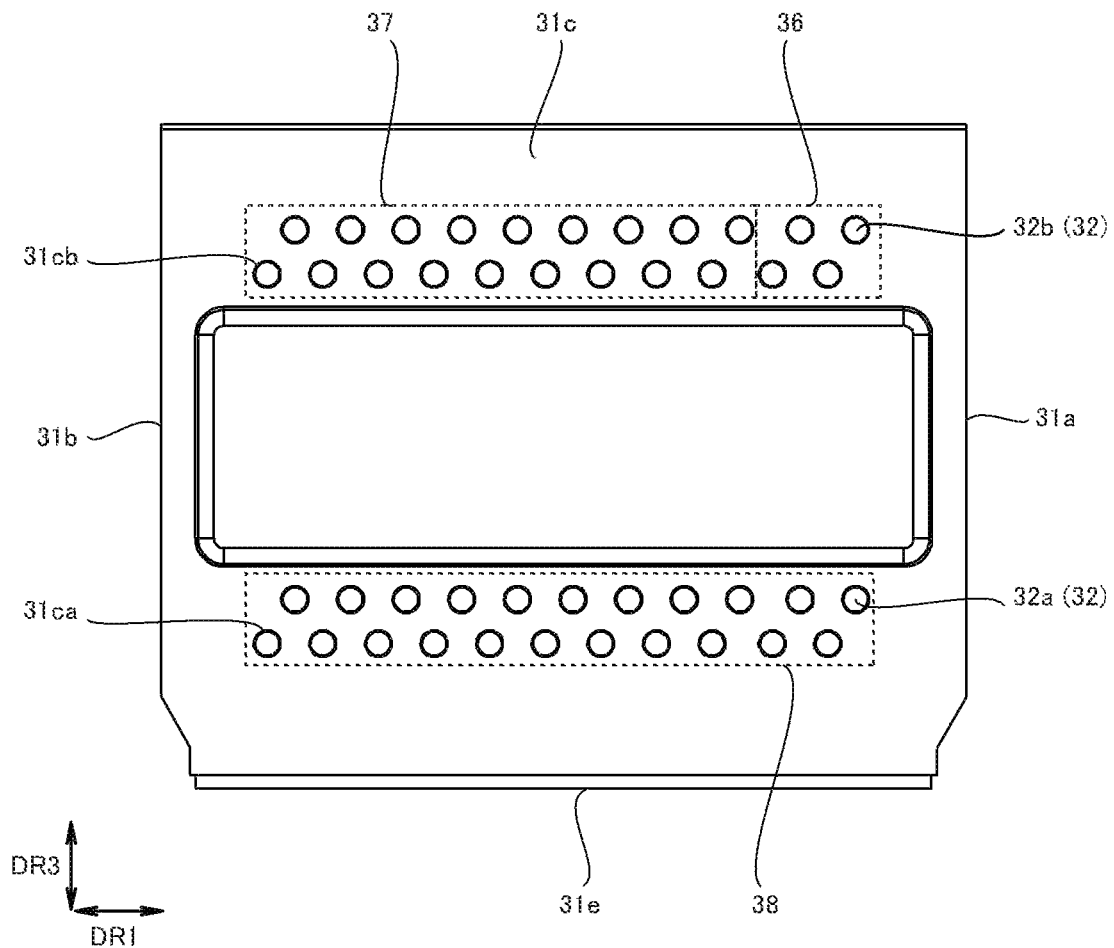
FIG. 5 is a front view of the secondary heat exchanger in a water heating apparatus.

FIG. 5 is a front view of the secondary heat exchanger 30 in the water heating apparatus 200. In FIG. 5, positions at which the header 36, the header 37, and the header 38 are mounted are indicated by dotted lines. As shown in FIG. 5, in the water heating apparatus 200, the secondary heat exchanger 30 has a header 36, a header 37, and a header 38 instead of the header 34 and the header 35.

The header 36 is connected to the second end portion 32b of the heat transfer tube 32 between the second portion 33b and the side wall 31a. The header 37 is connected to the second end portion 32b of the heat transfer tube 32 between the second portion 33b and the side wall 31b. The header 38 is connected to the first end portions 32a of all the heat transfer tubes 32. The insides of the headers 36 to 38 are hollow.

Although not shown, a water inlet 30a is formed in the header 36. The water inlet 30a communicates with the inside of the header 36. Although not shown, a water outlet 30b is formed in the header 37. The water outlet 30b communicates with the inside of the header 37.

The water supplied from the pipe 50 to the header 36 via the water inlet 30a flows through the heat transfer tube 32 between the second portion 33b and the side wall 31a and is supplied to the header 38. The water supplied to the header 38 flows through the heat transfer tube 32 between the second portion 33b and the side wall 31b and is supplied to the header 37. The water supplied to the header 37 is supplied to the pipe 60 via the water outlet 30b.

<Effects of Secondary Heat Exchanger 30 in Water Heating Apparatus 200>

In the heat exchanger, heat exchange with the combustion gas having a relatively low temperature is performed at a position at which the temperature of the water is relatively low, heat exchange with the combustion gas having a relatively high temperature is performed at a position at which the temperature of the water is relatively high, and thus the heat exchange becomes more efficient.

First, a temperature distribution of the combustion gas will be focused upon. The temperature of the combustion gas in a space between the second portion 33b and the side wall 31b (hereinafter, referred to as a "first space") is higher than the temperature of the combustion gas in a space between the second portion 33b and the side wall 31a (hereinafter, referred to as a "second space"). The temperature of the combustion gas in the first space increases as a distance from the bottom wall 31e increases. The temperature of the combustion gas in the second space increases as it approaches the bottom wall 31e.

Next, the order in which water flows will be focused upon. First, the water supplied to the header 36 flows through the heat transfer tube 32 in the second space to approach the bottom wall 31e and is supplied to the header 38. The water supplied to the header 38 flows through the heat transfer tube 32 in the first space away from the bottom wall 31e and is supplied to the header 37.

As described above, in the secondary heat exchanger 30 of the water heating apparatus 200, since the heat exchange with the combustion gas having a relatively low temperature is performed at the position at which the temperature of the water is relatively low and the heat exchange with the combustion gas having a relatively high temperature is performed at a position at which the temperature of the water is relatively high, the efficiency of heat exchange between the combustion gas and the water flowing through the heat transfer tube 32 is further improved.

Third Embodiment

Hereinafter, a water heating apparatus (hereinafter, referred to as "water heating apparatus 300") according to a third embodiment will be described. Here, points different from the water heating apparatus 100 will be mainly described, without repeated duplicated description.

<Schematic Configuration of Water Heating Apparatus 300>

The water heating apparatus 300 includes a gas valve 10, an orifice 11, a venturi 12, a blower 13, a chamber 14, a burner 15, a spark plug 16, a primary heat exchanger 20, a secondary heat exchanger 30, a duct 40, a pipe 50, a pipe 60, a pipe 70, and a bypass pipe 80. In this respect, the configuration of the water heating apparatus 300 is shared by the configuration of the water heating apparatus 100. However, the configuration of the water heat apparatus 300 is different from the configuration of the water heating apparatus 100 in the detailed configuration of the secondary heat exchanger 30.

<Detailed Configuration of Secondary Heat Exchanger 30 in Water Heating Apparatus 300>

Figure 6:
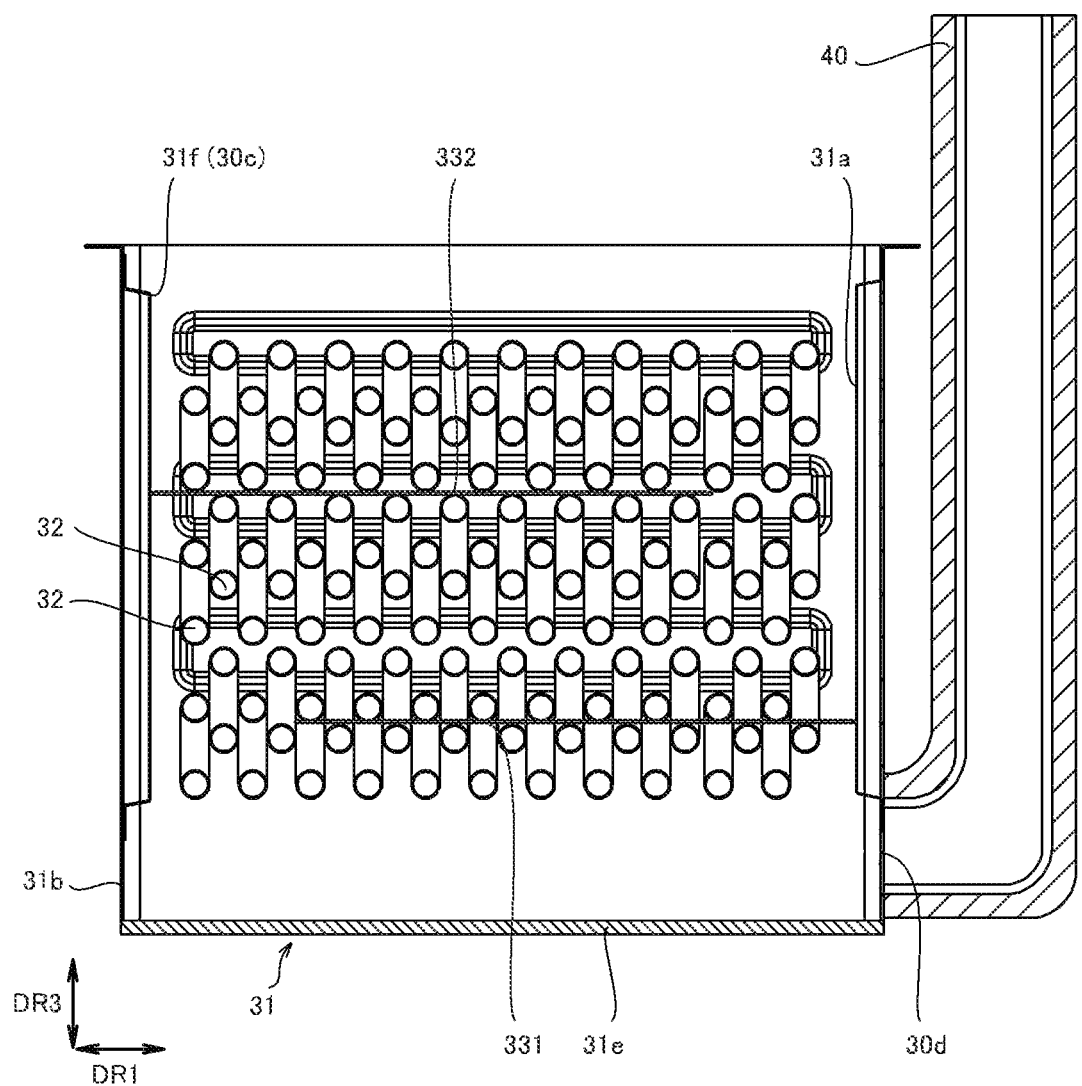
FIG. 6 is a cross-sectional view of the secondary heat exchanger in a water heating apparatus.

FIG. 6 is a cross-sectional view of the secondary heat exchanger 30 in the water heating apparatus 300. FIG. 6 shows a cross-sectional view at a position corresponding to line III-III of FIG. 2. As shown in FIG. 6, in the water heating apparatus 300, the secondary heat exchanger 30 includes two partition members 33 (these are referred to as a partition member 331 and a partition member 332). In the water heating apparatus 300, the gas inlet 30c is formed by the opening 31f, and the gas outlet 30d is formed on the lower end side of the side wall 31a.

The partition member 331 has a flat plate shape. One end of the partition member 331 in the first direction DR1 is mounted on the side wall 31a. The partition member 331 extends from the side wall 31a toward the side wall 31b in a plane intersecting the third direction. There is a gap between the other end of the partition member 331 in the first direction DR1 and the side wall 31b. A flow area of the combustion gas in the gap is smaller than the flow area of the combustion gas at the gas inlet 30c (the opening 31f).

The partition member 332 has a flat plate shape. One end of the partition member 332 in the first direction DR1 is mounted on the side wall 31b. The partition member 332 extends from the side wall 31b toward the side wall 31a in the plane intersecting the third direction. There is a gap between the other end of the partition member 332 in the first direction DR1 and the side wall 31a. A flow area of the combustion gas in the gap is smaller than the flow area of the combustion gas at the gas inlet 30c (the opening 31f).

The partition member 331 and the partition member 332 are closer to the gas inlet 30c (the opening 31f) than to the gas outlet 30d in the third direction DR3. The partition member 332 is closer to the gas inlet 30c than to the partition member 331 in the third direction DR3. Accordingly, the combustion gas meanders and flows inside the housing 31.

In the above, although the example in which the secondary heat exchanger 30 in the water heating apparatus 300 has the partition member 331 and the partition member 332 has been described, the secondary heat exchanger 30 in the water heating apparatus 300 may not have any one of the partition member 331 and the partition member 332.

<Effects of Secondary Heat Exchanger 30 in Water Heating Apparatus 300>

In the secondary heat exchanger 30 in the water heating apparatus 300, there is a gap in which the flow area of the combustion gas is smaller than that of the gas inlet 30c between the other end of the partition member 331 in the first direction DR1 and the side wall 31b and between the other end of the partition member 332 in the first direction DR1 and the side wall 31a. Therefore, in the secondary heat exchanger 30 in the water heating apparatus 300, similar to the secondary heat exchanger 30 in the water heating apparatus 100, the efficiency of heat exchange between the combustion gas and the water flowing through the heat transfer tube 32 is improved.

Although the embodiments of the present disclosure have been described above, it is also possible to modify the above-described embodiments in various ways. Moreover, the scope of the present disclosure is not limited to the above-described embodiments. The scope of the present disclosure is indicated by the scope of claims and is intended to include all modifications within the meaning and scope equivalent to the scope of claims.

The above-described embodiments are particularly advantageously applied to a heat exchanger and a water heating apparatus having the heat exchanger.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A heat exchanger comprising:
a gas inlet through which a combustion gas flows in; and
a gas outlet through which the combustion gas flows out,
wherein the heat exchanger comprises a housing in which the gas outlet is formed, a partition member, and a plurality of heat transfer tubes accommodated in the housing,
the partition member is mounted in the housing,
the plurality of heat transfer tubes meanders in a plane intersecting a first direction and is disposed to overlap each other in the first direction,
the housing comprises a first side wall, a second side wall, a third side wall, a fourth side wall, and a bottom wall,
the first side wall and the second side wall face each other in the first direction,
the third side wall and the fourth side wall face each other in a second direction intersecting the first direction,
the gas outlet is formed in the first side wall,
the housing has an opening defined by the first side wall, the second side wall, the third side wall and the fourth side wall,
the partition member comprises a first portion configured to define the gas inlet by closing a part of the opening, and a second portion configured to extend from the first portion toward the bottom wall in a plane intersecting the first direction, and
a flow area of the combustion gas in a gap between a lower end of the second portion and the bottom wall is smaller than a flow area of the combustion gas at the gas inlet,
the heat exchanger further comprising a first header, a second header and a third header mounted on the third side wall,
wherein a water inlet is formed in the first header,
a water outlet is formed in the second header,
each of the plurality of heat transfer tubes comprises a first end portion, and a second end portion closer to the opening than the first end portion in a third direction intersecting the first direction and the second direction,
the second end portion of each of the plurality of heat transfer tubes between the second portion and the first side wall is connected to the first header,
the second end portion of each of the plurality of heat transfer tubes between the second portion and the second side wall is connected to the second header, and
the first end portion of each of the plurality of heat transfer tubes is connected to the third header.

2. A water heating apparatus comprising:
a heat exchanger according to claim 1;
a burner configured to generate the combustion gas; and
a duct connected to the gas outlet.

* * * * *